US010099167B2

United States Patent
Kaupert et al.

(10) Patent No.: US 10,099,167 B2
(45) Date of Patent: Oct. 16, 2018

(54) DEVICE FOR THE DETACHABLE FASTENING OF A DRYING AGENT CARTRIDGE TO A HOUSING OF A COMPRESSED-AIR TREATMENT INSTALLATION OF A VEHICLE

(71) Applicant: MAN Truck & Bus AG, München (DE)

(72) Inventors: Oliver Kaupert, München (DE); Wolfgang Kolland, München (DE); Georg Haslberger, Reichertsheim (DE); Thomas Hofstetter, Mainburg (DE)

(73) Assignee: MAN Truck & Bus AG, München (DE)

( * ) Notice: Subject to any disclaimer, the term of this patent is extended or adjusted under 35 U.S.C. 154(b) by 97 days.

(21) Appl. No.: 15/294,150

(22) Filed: Oct. 14, 2016

(65) Prior Publication Data

US 2017/0106324 A1    Apr. 20, 2017

(30) Foreign Application Priority Data

Oct. 16, 2015  (DE) .................. 10 2015 013 492

(51) Int. Cl.
*B01D 53/02* (2006.01)
*B01D 53/04* (2006.01)
*B60T 17/00* (2006.01)
*F16B 2/24* (2006.01)

(52) U.S. Cl.
CPC ........ *B01D 53/0407* (2013.01); *B60T 17/004* (2013.01); *F16B 2/241* (2013.01)

(58) Field of Classification Search
CPC ............ B01D 2257/80; B01D 2258/06; B01D 2259/4566; B01D 53/0407; B01D 53/0415; B01D 53/261; B60T 17/004; F16M 13/02
See application file for complete search history.

(56) References Cited

U.S. PATENT DOCUMENTS

| 5,110,327 A | 5/1992 | Smith |
| 5,374,401 A | 12/1994 | von Berg |
| 7,972,418 B2 | 7/2011 | Hilberer |

(Continued)

FOREIGN PATENT DOCUMENTS

| DE | 8518993 U1 | 10/1986 |
| DE | 19721230 A1 | 11/1998 |

(Continued)

OTHER PUBLICATIONS

European Search Report issued in corresponding application No. 16001903.0 dated Jan. 3, 2017.

*Primary Examiner* — Christopher P Jones
(74) *Attorney, Agent, or Firm* — Carter, DeLuca, Farrell & Schmidt, LLP (57) ABSTRACT

A device is provided for the detachable fastening of a drying agent cartridge to a housing of a compressed-air treatment installation of a vehicle, in particular of a utility vehicle. The device includes a crimped formation on the cartridge base of the drying agent cartridge, which crimped formation has an abutment surface, and an insertion opening on the housing of the compressed-air treatment installation, into which insertion opening the crimped formation can be inserted at least in sections, and in which insertion opening the crimped formation, in the inserted state, is secured in an axial direction by way of a form fit.

11 Claims, 4 Drawing Sheets

(56) References Cited

U.S. PATENT DOCUMENTS

| | | |
|---|---|---|
| 8,021,465 B2 | 9/2011 | Hilberer |
| 2009/0199522 A1 | 8/2009 | Hilberer |
| 2009/0199523 A1 | 8/2009 | Hilberer |
| 2011/0308393 A1 | 12/2011 | Minato et al. |
| 2013/0239815 A1 | 9/2013 | Niemeyer et al. |

FOREIGN PATENT DOCUMENTS

| | | |
|---|---|---|
| DE | 102006037311 A1 | 2/2008 |
| DE | 102007034435 A1 | 1/2009 |
| DE | 102012105137 A1 | 12/2013 |
| DE | 102013103066 A1 | 10/2014 |
| EP | 2465597 A2 | 6/2012 |
| WO | 2013/057088 A1 | 4/2013 |

DEVICE FOR THE DETACHABLE FASTENING OF A DRYING AGENT CARTRIDGE TO A HOUSING OF A COMPRESSED-AIR TREATMENT INSTALLATION OF A VEHICLE

TECHNICAL FIELD

The present disclosure relates to a device for the detachable fastening of a drying agent cartridge to a housing of a compressed-air treatment installation of a vehicle, in particular of a utility vehicle.

BACKGROUND

Compressed-air systems, in particular in utility vehicles, require a so-called air treatment installation downstream of the air compressor. In such treatment installations, the air is, inter alia, dried and filtered, and oil constituents are separated out. These processes all take place in a so-called drying agent cartridge which, broadly speaking, is composed of a base panel with openings for the throughflow of the air and of a cup-shaped or pot-shaped cover, which base panel and cover are fixedly connected to one another. In the drying agent cartridge there is situated a moisture-adsorbing granulate which extracts the moisture from the air flowing through. When used in a utility vehicle, the granulate has only a limited service life. A reason for this is that the oil mist contained in the compressed air is deposited on the granulate and thus reduces the effective surface area for the absorption of moisture. Furthermore, the granulate can mechanically break down as a result of the vibration loading. The drying agent cartridge must therefore be exchanged at regular intervals.

For this purpose, the cartridge is typically equipped with a female thread in the base panel. It is thus possible for the used cartridge to be unscrewed from, and for a new cartridge to be screwed onto, an external thread on the housing of the compressed-air treatment installation, for example on the air dryer housing. Use is normally made of a square-section sealing ring which is compressed axially as a result of the screwing-on process, thus imparts a sealing action, and at the same time ensures the axial bracing action of the screw connection. Drying agent cartridges of the type are known for example from the laid-open specifications DE 10 2013 103 066 A1, DE 10 2012 105 137 A1 and DE 10 2007 034 435 A1.

Depending on the installation location of the compressed-air treatment installation, the accessibility to the cartridge for an exchange is often restricted. The cartridge is always fastened to the top of the housing of the compressed-air treatment installation, and therefore the optimum direction of access for the exchange of the cartridge would be from above. This freedom however does not always exist owing to body structures in the case of heavy goods vehicles or generally in the case of buses. Furthermore, work is often performed from below if the vehicle is standing over the workshop pit.

Nowadays, in some cases very firmly seated cartridges exist, in the case of which the predefined service times for the cartridge exchange in the workshop cannot be adhered to. A very high release moment is required, which, despite auxiliary means such as for example a clamping strap with a long lever, is difficult to apply because the lateral free space for the use of a lever does not exist.

In the case of the fastenings between cartridge base panel and housing of the compressed-air treatment unit such as are known from practice, because the sealing element, typically a square-section sealing ring, must co-rotate during the screwing-on process, large fluctuations arise in the tightening moment owing to different friction influences, and damage to or twisting of the sealing element occurs, which in turn results in leakage. Furthermore, the axial bracing action of the screw connection must be generated by way of the seal.

SUMMARY

It is therefore an object of the present disclosure to provide an improved means for being able to fasten a drying agent cartridge to a housing of an air treatment installation, by which means the disadvantages of conventional techniques can be avoided. In particular, it is the object of the present disclosure to provide a fastening interface for a drying agent cartridge, by way of which fastening interface the cartridge can be fastened in sealed-off fashion to a housing of the air treatment installation, for example of the air dryer, and can be safely and reliably released again with constant expenditure of force.

The objects are achieved by way of a device having the features of the independent claim. Advantageous embodiments and uses of the present disclosure will emerge from the dependent claims and will be discussed in more detail in the following description, with partial reference to the figures.

According to general aspects of the present disclosure, a device for the detachable fastening of a drying agent cartridge to a housing of a compressed-air treatment installation or air drying installation of a vehicle is provided. The device provides an interface for the detachable fastening of the drying agent cartridge to the housing. The housing may for example be a housing of the air dryer. The compressed-air treatment installation may be provided for a compressed-air brake installation of a vehicle. The vehicle may be a utility vehicle.

The drying agent cartridge, also referred to as drying cartridge, comprises, in a manner known per se, a cartridge housing in which there is held a drying agent container. The cartridge housing has a cover, which delimits the cartridge housing in an upward direction and which is typically of cup-shaped or pot-shaped form, and a carrier element which delimits the cartridge housing in a downward direction. In the installed position, the carrier element is detachably fastened to the housing section of the compressed-air treatment installation and will hereinafter also be referred to as cartridge base. The cartridge base comprises a crimped plate (also referred to as crimped panel) for the fastening of the cartridge base to the cartridge cover by way of a crimped formation. The encircling region on the cartridge base, at which the cartridge base is crimped to the cartridge cover, forms the so-called cartridge seam.

According to the present disclosure, a fastening device is proposed which makes do without the conventional central screw connection, in the case of which the cartridge housing is screwed onto an external thread, which extends axially centrally through the drying agent cartridge, of the housing section.

Instead, the present disclosure provides for a crimped formation to be formed on the cartridge base such that an abutment surface for an axial bracing action is realized, in particular an abutment surface which is oriented radially when in an installed position. Furthermore, the present disclosure provides for an insertion opening to be provided on the housing of the compressed-air treatment installation, into which insertion opening the crimped formation can be inserted at least in sections, and in which insertion opening the crimped formation, in the inserted state, is secured in an axial direction by way of a form fit. Then, in the inserted state, the abutment surface lies against and/or on a corresponding abutment surface of the insertion opening. The crimped section that can be inserted into the insertion opening is of at least two-layer form.

The crimped formation that is utilized for the axial clamping action preferably comprises a crimped formation of the crimped plate of the cartridge base and thus, as per this variant, at least two bent layers of the crimped plate. A crimped formation is a section of a crimped plate that has been deformed by bending.

The proposed interface device thus forms a plug-type connection for the detachable installation of the drying agent cartridge, such that the drying agent cartridge can be fastened to the housing of the air treatment installation only by way of a form fit.

The insertion opening may be formed for example as a recess, insertion pocket of the housing of the air treatment installation or by a clip which defines a receiving opening. The crimped formation can be inserted into the insertion opening preferably in a radial direction. The radial direction lies in the plane of the base panel of the drying agent cartridge, that is to say the possible radial directions are spanned by the plane of the base panel of the drying agent cartridge. The radial direction is furthermore perpendicular to the axial direction, wherein the axial direction corresponds to the direction of the screw-connection axis or of the central axis, which is perpendicular to the cartridge base, of the drying agent cartridge.

Owing to the omission of the central screw connection, the following operational advantages are obtained: Owing to the absence of a thread, no chips are formed during the mounting of the cartridge. The damage to the sealing element that is otherwise possible as a result of the screw connection is avoided, such that the occurrence of leakages and malfunctions in the compressed-air and in particular brake system owing to foreign particles introduced during a cartridge exchange can be avoided. Furthermore, greater ease of maintenance during a cartridge exchange can be realized. A reason for this is that a sealing element arranged between cartridge base and housing of the compressed-air treatment installation, for example a square-section sealing ring, does not have to co-rotate during the installation of the cartridge, such that fluctuations in the tightening moment owing to different friction influences, and damage to or twisting of the sealing element, can be avoided. Furthermore, the lubrication of the sealing element can thus likewise be omitted. In this way, chemical damage to the seal owing to the use of incorrect lubricants can be avoided. A further advantage is that, owing to the omission of the central thread, the base panel no longer needs to be of such massive design, and thus a weight saving of approximately 0.5 kg can be achieved in the case of the cartridge. Furthermore, the cartridge can be mounted in freely rotatable fashion on the housing. It can thus also be ensured in future that a labelling, for example a brand logo, and/or operating instructions on the cartridge are always oriented in the same direction, for example toward the outside of the vehicle, where they are clearly visible. This cannot be ensured with the previous, screwed-on cartridge.

The use of a crimped formation on the cartridge base for forming the plug-type connection furthermore offers the particular advantage that no further additional components, such as for example a bayonet ring etc., are required for forming a form-fitting connection.

In an embodiment, the crimped formation that can be inserted into the insertion opening is the crimped connecting seam between cartridge base and cartridge housing, that is to say the cartridge seam that fastens the cartridge housing to the cartridge base. For this purpose, the connecting seam is preferably designed to be slightly wider than normal, in order, by way of the widened connecting seam, to form an adequately large radial abutment surface. In this embodiment, the cartridge seam can be inserted into the insertion opening arranged on the housing and, in the inserted state, secured in an axial direction by way of a form fit.

In an advantageous variant of this embodiment, the widened cartridge seam is crimped upward 90° less than conventional cartridge seams. In other words, in this variant, the connecting seam has a U-shaped crimped formation of the crimped plate of the cartridge base, in particular a U-shaped crimped formation of the radially outer end region of the crimped plate, and a standing seam, arranged in the U-shaped crimped formation, of the cartridge housing cover, that is to say an end section, which is crimped by 90°, of the cartridge housing cover. The limbs of the U-shaped crimped formation extend in this case in a radial direction, that is to say parallel to the plane of the cartridge base. This variant offers the particular advantage that only a minor adaptation is necessary in the production of the cartridge seam in order to widen the cartridge seam.

An alternative variant of the implementation according to the present disclosure likewise provides a widening of the connecting seam between cartridge base and cartridge housing, which widening is however formed by a radially extending crimped lug, which circumferentially surrounds the crimped region between cartridge base and cartridge housing, that is to say the conventional cartridge seam, and by a 180° crimped formation of the crimped plate of the cartridge base, before the crimped plate is crimped to the cartridge housing. Here, the insertion opening is arranged such that the crimped lug can be inserted at least in sections into the insertion opening. For the axial clamping action, therefore, use is made merely of a two-layer crimped formation of the crimped plate of the cartridge base. By contrast to the preceding variant, the seam widening is formed only by the crimped plate of the base panel, without an additional layer of the cartridge cover. This variant likewise offers the advantage that an existing component, in this case the crimped plate of the cartridge base, is used to realize a widening of the cartridge seam. The additional crimped lug is easy to produce and can be implemented with little additional use of material.

In a further embodiment, the crimped plate of the cartridge base forms a hook-like and/or right-angled, preferably two-layer, crimped formation, having a first section which extends away from the cartridge cover in an axial direction, and having a second section which adjoins the first section and which extends in a radial direction, wherein the second insertion opening is arranged on the housing such that the second section can be inserted into the insertion opening and, in the inserted state, secures the cartridge in an axial direction by way of a form fit. In this embodiment, the crimped plate of the cartridge base is, after the formation of the hook-like crimped formation, crimped to the cartridge cover to form the cartridge seam. This variant is particularly suitable if little additional radial structural space for forming a seam widening or abutment surface is available in the region of the cartridge seam.

According to a further measure, the crimped formation, which can be inserted at least in sections into the insertion opening, may have a relative-rotation prevention means. The relative-rotation prevention means may be formed for example by a hole in the crimped formation and by a locking element, in particular a locking pin, for example a screw or a bolt, which is seated in the hole. The relative-rotation prevention means may also be formed as a flattened portion, in sections, of the crimped formation, that is to say the contour of the crimped formation which is of encircling form in a circumferential or radial direction is not of circular curvature, but rather is for example straight, at at least one point. The relative-rotation prevention means may be arranged for example on the cartridge seam, in particular at the outside on the cartridge seam, and thus also outside, as viewed in a radial direction, a sealing element which is arranged between cartridge housing and air treatment installation housing. This also offers the advantage that the relative-rotation prevention means does not have to be realized by way of axial clamping of the sealing element, and the sealing element can thus be arranged such that it does not have to be rotated during the installation of the drying agent cartridge.

The present disclosure also relates to a motor vehicle, in particular a utility vehicle, having a device as described in this document.

BRIEF DESCRIPTION OF THE DRAWINGS

The above-described embodiments and features of the present disclosure may be combined with one another in any desired manner. Further details and advantages of the present disclosure will be described below with reference to the appended drawings. In the drawings.

Identical elements are denoted by the same reference designations in all of the figures.

DETAILED DESCRIPTION OF THE DRAWINGS

Figure 1:
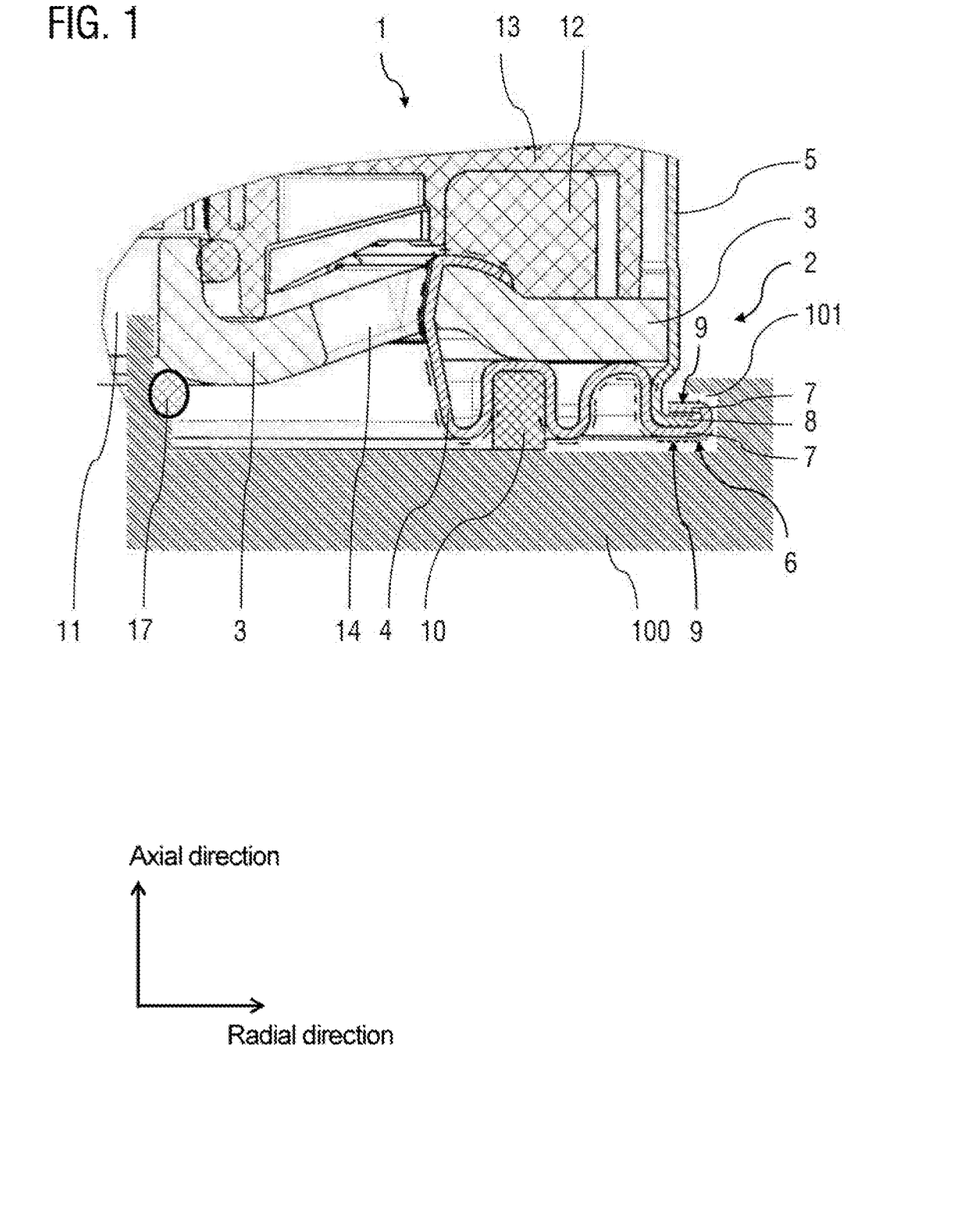
FIG. 1 shows a sectional detail view of a device according to an exemplary embodiment of the present disclosure.

Here, FIG. 1 shows a sectional detail view of a drying agent cartridge according to an exemplary embodiment of the present disclosure. FIG. 1 shows, in particular, a detail of a radially outer, lower region of a drying agent cartridge 1. The internal construction of the drying agent cartridge 1 may be of a design known per se, for example as described in the laid-open specifications DE 10 2013 103 066 A1, DE 10 2012 105 137 A1 and DE 10 2007 034 435 A1. The reference designation 12 denotes, for example, the oil filter, which is formed by a nonwoven, and the reference designation 13 denotes the internal container for the drying agent, of which only a small part is visible. The vertical arrow in FIG. 1 indicates the axial direction of the drying agent cartridge, and the horizontal arrow denotes the radial direction of the drying agent cartridge.

In a manner known per se, the cartridge housing of the drying agent cartridge has a pot-shaped or cup-shaped cartridge housing cover 5, hereinafter also referred to for short as cover, which delimits the cartridge housing in an upward direction, and a cartridge base 2, which delimits the cartridge housing in a downward direction.

As is likewise described in the laid-open specifications DE 10 2013 103 066 A1, DE 10 2012 105 137 A1 and DE 10 2007 034 435 A1, the cartridge base 2 is formed from a carrier panel 3 and a crimped plate 4, wherein the fastening between carrier panel 4 and the pot-shaped cartridge housing cover 5 of the drying agent cartridge is realized by way of the crimped plate 4 by virtue of the cartridge housing cover 5 and the crimped plate 4 being crimped together, thereby forming the encircling cartridge seam 6. The carrier element has a central outflow opening 11, via which the dried and purified air exits the drying agent cartridge. FIG. 1 also shows the air inflow opening 14 in the carrier panel 3. Furthermore, a sealing ring 10 is arranged in a seal groove, which sealing ring serves for sealing off the cartridge housing with respect to the housing of the air treatment installation in the installed state. The seal groove is formed by a crimped formation of the crimped plate 4. A further sealing element 17 surrounds the outflow opening 11 on the cartridge base 3 in order to form a seal between the unfiltered air at the outside and the purified air from the interior of the drying agent cartridge.

The special feature of this design variant lies firstly in the fact that the cartridge seam 6 is crimped upward 90° less than a conventional cartridge seam, and is thus widened slightly. In other words, the connecting seam 6 according to this variant has a U-shaped crimped formation of the radially outer end region of the crimped plate 4, with the two limbs 7 of the U-shaped crimped formation. In the U-shaped crimped formation there is arranged a standing seam 8 of the cartridge housing cover 5, that is to say an end section, which is crimped through 90°, of the cartridge housing cover 5.

By way of this embodiment of the cartridge seam 6, the limbs 7 of the crimped plate 4 each form an abutment surface 9.

A further special feature of this design variant lies in the fact that the housing 100 of the compressed-air treatment installation, for example the air dryer housing, has, at the installation point for the drying agent cartridge 1, an insertion opening 101 into which the widened cartridge seam in the radial direction can be inserted at least in sections and, in the inserted state, is secured in an axial direction by way of a form fit, because the abutment surfaces 9 are secured by the inner walls of the insertion opening 101. The insertion opening is thus arranged and dimensioned such that a region of the cartridge seam 6 can be received therein. It is also possible for two or more such insertion openings 101 to be provided in a circumferential direction of the seam 6.

Figure 2:
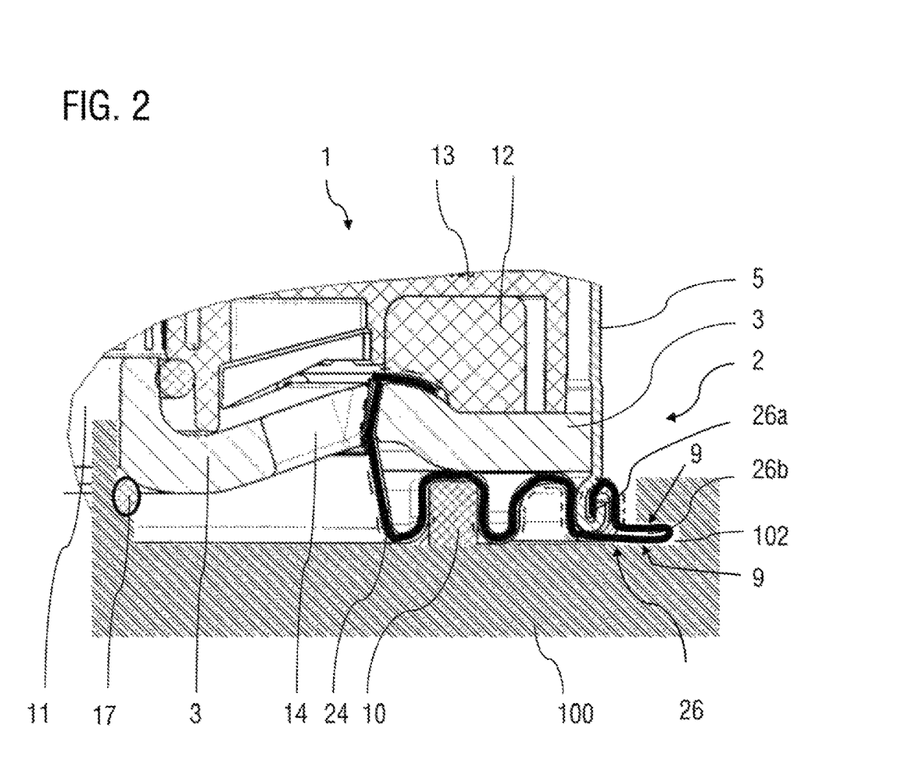
FIG. 2 shows a sectional detail view of a device according to a further exemplary embodiment of the present disclosure.

FIG. 2 shows a sectional detail view of a device according to a further exemplary embodiment of the present disclosure. Here, components with the same reference designations correspond to the components of FIG. 1, and will not be described separately.

By contrast to FIG. 1, that region 26a of the cartridge seam at which the cartridge housing cover 5 and the crimped plate 24 are crimped together is crimped 90° more than the cartridge seam 6 in FIG. 1, correspondingly to a cartridge seam such as is known per se. The special feature of this variant is that the cartridge seam is widened by way of a radially extending crimped lug 26b. The crimped lug 26b circumferentially surrounds that region 26a of the cartridge seam at which the cartridge housing cover 5 and the crimped plate 24 are crimped together, that is to say the crimped region 26a between cartridge base 2 and cartridge housing cover 5, that is to say the conventional cartridge seam, and is formed by a 180° crimped formation of the crimped plate 24 of the cartridge base 2 before the crimped plate 24 is crimped to the cartridge housing cover 5.

The housing 100 of the air treatment installation has, in turn, an insertion opening 102 which is arranged and dimensioned such that the crimped lug 26b can be inserted at least in sections into the insertion opening 102. For the axial clamping action, therefore, use is made merely of a two-layer crimped formation (in the form of the crimped lug) of the crimped plate 24 of the cartridge base 2.

Figure 3:
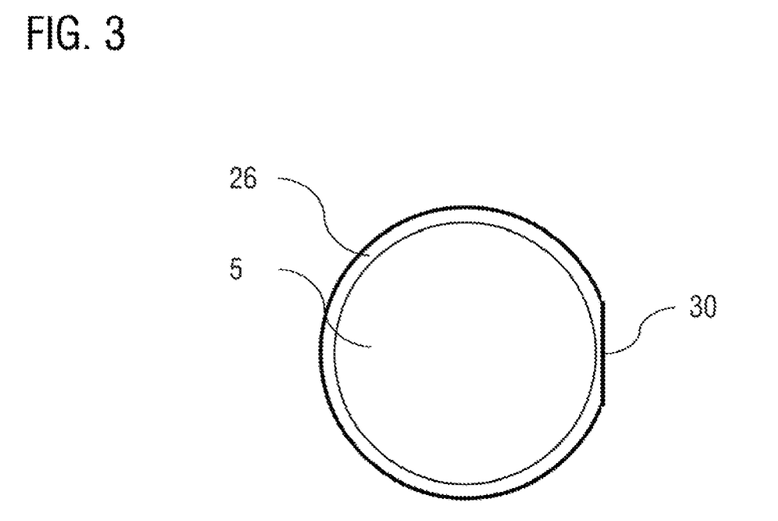
FIG. 3 shows a schematic plan view of a drying agent cartridge according to a further exemplary embodiment of the present disclosure.

FIG. 3 shows a schematic plan view of a drying agent cartridge for illustrating a relative-rotation prevention means according to a further exemplary embodiment of the present disclosure. The reference designation 26 again denotes the widened cartridge seam which projects in a radial direction from the cartridge housing cover 5 at the base region of the drying agent cartridge. The cartridge seam may also be formed as per the cartridge seam 6 in FIG. 1. To form a relative-rotation prevention means, the cartridge seam 26 has a flattened portion 30 in sections, which flattened portion, in the inserted state in the insertion opening 102, bears against a planar rear wall of the insertion opening 102 and thus forms a relative-rotation prevention means.

Figure 4:
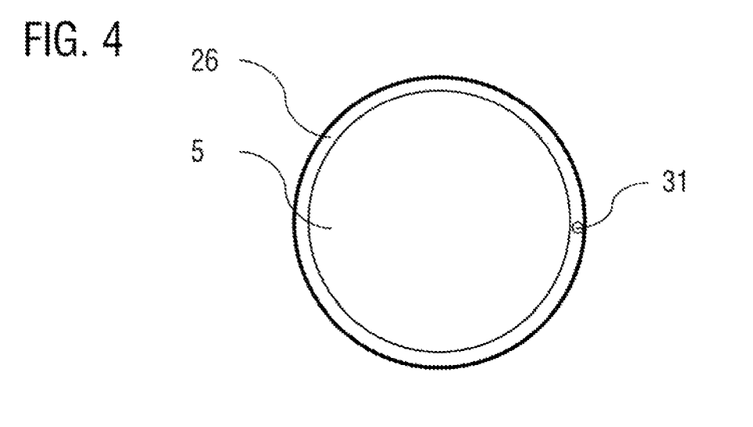
FIG. 4 shows a schematic plan view of a drying agent cartridge according to a further exemplary embodiment of the present disclosure.

An alternative variant is shown in FIG. 4. To form a relative-rotation prevention means, the cartridge seam 26 has a hole 31 into which a pin-like locking element, for example a screw, is inserted in order to secure the drying agent cartridge against rotation in the installed position.

Figure 5:
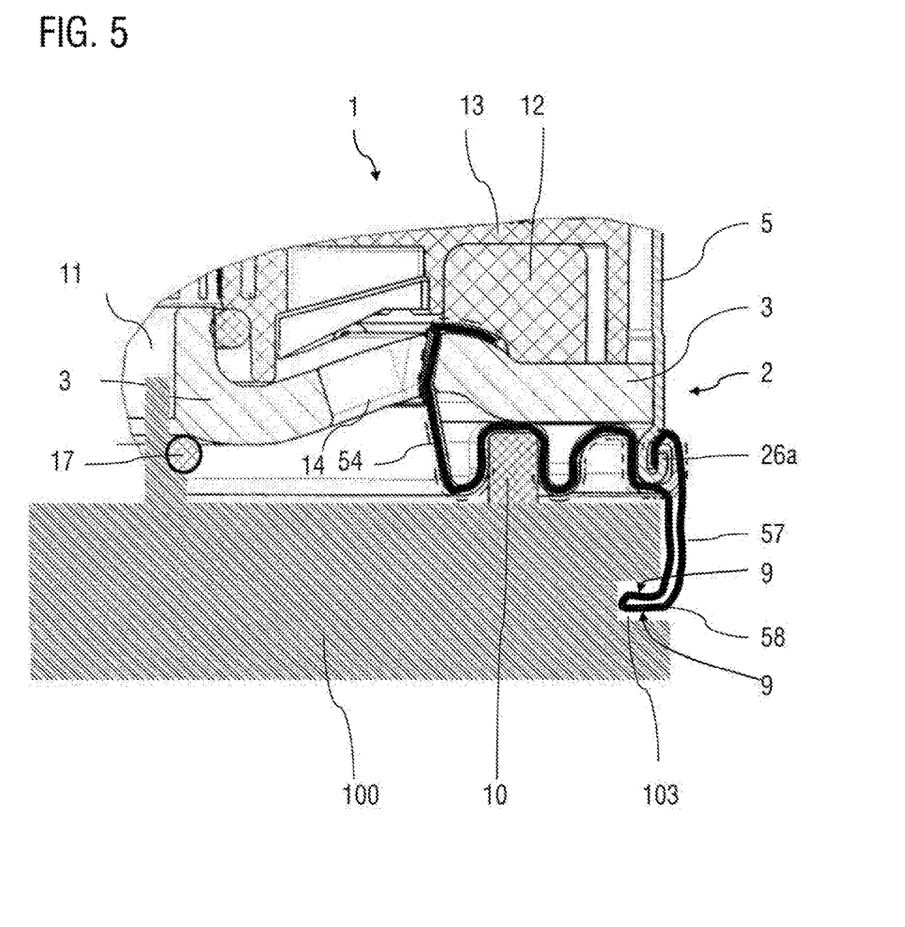
FIG. 5 shows a sectional detail view of a device according to a further exemplary embodiment of the present disclosure.

FIG. 5 shows a sectional detail view of a further exemplary embodiment. Here, components with the same reference designations correspond to the components of FIG. 1 and FIG. 2, and will not be described separately.

A special feature of this exemplary embodiment lies in the fact that the crimped plate 54 of the cartridge base forms a hook-like, two-layer crimp formation 57, 58, having a first section 57, which extends away from the cartridge cover in an axial direction proceeding from the cartridge seam, that is to say that region 26a of the cartridge seam at which the cartridge housing cover 5 and the crimped plate 24 are crimped together, and having a second section 58, which adjoins the first section and which extends inward in a radial direction, that is to say radially in the direction of the centre of the cartridge.

The insertion opening 103 is arranged on the housing 100 of the air treatment installation such that the second section 58 can be inserted into the insertion opening and, in the inserted state, secures the cartridge in an axial direction by way of a form fit. After the formation of the hook-like crimped formation 57, 58, the crimped plate 54 of the cartridge base 2 is crimped to the cartridge housing cover 5 to form the cartridge seam.

Although the present disclosure has been described with reference to particular exemplary embodiments, it is evident to a person skilled in the art that various changes may be made, and equivalents used as replacements, without departing from the scope of the present disclosure. Furthermore, numerous modifications may be made without departing from the associated scope. Consequently, the present disclosure is not intended to be restricted to the disclosed exemplary embodiments, but is rather intended to encompass all exemplary embodiments which fall within the scope of the appended patent claims. In particular, the present disclosure also claims protection for the subject matter and the features of the subclaims independently of the claims referred to.

The invention claimed is:

1. A device for the detachable fastening of a drying agent cartridge to a housing of a compressed-air treatment installation of a vehicle, comprising:
    a crimped formation on the cartridge base of the drying agent cartridge, wherein the crimped formation has an abutment surface; and
    an insertion opening on the housing of the compressed-air treatment installation, wherein the crimped formation can be inserted into the insertion opening at least in sections and, in the inserted state, is secured in an axial direction by way of a form fit;
    wherein the connecting seam between the cartridge base and a cartridge housing cover includes a widening, the widening formed by a radially extending crimped lug which circumferentially surrounds the crimped region between the cartridge base and the cartridge housing cover and formed by a 180° crimped formation of a crimped plate of the cartridge base, wherein the insertion opening is arranged such that the crimped lug can be inserted at least in sections into the insertion opening.

2. The device according to claim 1, wherein the crimped formation that can be inserted into the insertion opening is a crimped connecting seam between the cartridge base and a cartridge housing cover.

3. The device according to claim 2, wherein the connecting seam is formed by a U-shaped crimped formation of a crimped plate of the cartridge base and by a standing seam, arranged in the U-shaped crimped formation, of the cartridge housing cover, wherein limbs of the U-shaped crimped formation extend in a radial direction.

4. A device for the detachable fastening of a drying agent cartridge to a housing of a compressed-air treatment installation of a vehicle, comprising:
    a crimped formation on the cartridge base of the drying agent cartridge, wherein the crimped formation has an abutment surface; and
    an insertion opening on the housing of the compressed-air treatment installation, wherein the crimped formation can be inserted into the insertion opening at least in sections and, in the inserted state, is secured in an axial direction by way of a form fit;
    wherein a crimped plate of the cartridge base forms a hook-like crimped formation, having a first section which extends away from a cartridge housing cover in an axial direction, and having a second section which adjoins the first section and which extends in a radial direction, wherein the insertion opening is arranged on the housing such that the second section can be inserted into the insertion opening and, in the inserted state, secures the cartridge in the axial direction by way of the form fit.

5. The device according to claim 1, wherein the crimped formation, which can be inserted at least in sections into the insertion opening, has a relative-rotation prevention means.

6. The device according to claim 5, wherein the relative-rotation prevention means is formed by a hole in the crimped formation and by a locking element, in particular a locking pin, which is seated in the hole.

7. The device according to claim 5, wherein the relative-rotation prevention means is formed as a flattened portion, in sections, of the crimped formation.

8. The device according to claim 1, wherein the drying agent cartridge can be fastened to the housing of the air treatment installation only by way of a form fit.

9. The device according to claim 1, wherein the drying agent cartridge has no thread for the purposes of screwing the cartridge to the housing of the air treatment installation.

10. A motor vehicle comprising:
  a device for the detachable fastening of a drying agent cartridge to a housing of a compressed-air treatment installation of the utility vehicle, the device comprising:
    a crimped formation on the cartridge base of the drying agent cartridge, wherein the crimped formation has an abutment surface; and
    an insertion opening on the housing of the compressed-air treatment installation, wherein the crimped formation can be inserted into the insertion opening at least in sections and, in the inserted state, is secured in an axial direction by way of a form fit;
  wherein the connecting seam between the cartridge base and a cartridge housing cover includes a widening, the widening formed by a radially extending crimped lug which circumferentially surrounds the crimped region between the cartridge base and the cartridge housing cover, and is formed by a 180° crimped formation of a crimped plate of the cartridge base, wherein the insertion opening is arranged such that the crimped lug can be inserted at least in sections into the insertion opening; or
  wherein a crimped plate of the cartridge base forms a hook-like crimped formation, having a first section which extends away from a cartridge housing cover in an axial direction, and having a second section which adjoins the first section and which extends in a radial direction, wherein the insertion opening is arranged on the housing such that the second section can be inserted into the insertion opening and, in the inserted state, secures the cartridge in the axial direction by way of the form fit.

11. The device according to claim 1, wherein the drying agent cartridge has no thread arranged on the cartridge base for the purposes of screwing the cartridge to the housing of the air treatment installation.

* * * * *